United States Patent [19]

Tsutsui et al.

[11] 4,245,291
[45] Jan. 13, 1981

[54] ELECTRIC POWER CONVERTER APPARATUS FOR AN A.C. ELECTRIC ROLLING STOCK

[75] Inventors: Yoshio Tsutsui, Katsuta; Kyozo Tachibana, Yokohama; Hiroaki Ishikawa, Hitachi, all of Japan

[73] Assignee: Hitachi, Ltd., Japan

[21] Appl. No.: 41,886

[22] Filed: May 23, 1979

[30] Foreign Application Priority Data

May 25, 1978 [JP] Japan ................................ 53-61687
Jul. 26, 1978 [JP] Japan ................................ 53-90420

[51] Int. Cl.³ .................... H02M 7/19; H02P 13/16
[52] U.S. Cl. .................................. 363/68; 363/44; 363/128
[58] Field of Search .......................... 363/65, 67–70, 363/44–45, 85–86, 126–128; 307/17, 30, 42

[56] References Cited

U.S. PATENT DOCUMENTS

| 3,419,786 | 12/1968 | Brane | 363/68 |
|---|---|---|---|
| 3,909,697 | 9/1975 | Depenbrock | 363/126 |
| 4,020,411 | 4/1977 | Tsuboi et al. | 363/68 |
| 4,030,018 | 6/1977 | Tsuboi | 363/68 |
| 4,045,722 | 8/1977 | Tachibana | 363/126 |
| 4,122,515 | 10/1978 | Tachibana et al. | 363/45 |

FOREIGN PATENT DOCUMENTS 830603  3/1980  United Kingdom ..................... 363/68

Primary Examiner—William M. Shoop
Assistant Examiner—Peter S. Wong
Attorney, Agent, or Firm—Craig & Antonelli

[57] ABSTRACT

A power converter apparatus for an a.c. electric rolling stock comprising two transformers, each including a primary winding and a plurality of secondary windings generating the same output voltages but having different internal reactances; a pair of phase-controlled bridge rectifier circuits, each being connected to one secondary winding of each transformer; and diode bridge rectifier circuits connected to the other secondary windings, wherein the windings connected to the pair of phase-controlled bridge rectifier circuits have different internal reactances, and the phase-controlled bridge rectifier circuits are simultaneously controlled, and when the maximum output voltages from the phase-controlled bridge rectifier circuits are reached, the output voltages from the diode bridge rectifier circuits (non-phase-controlled) are increased to their maximum values, then the output voltages from the phase-controlled bridge rectifier circuits are decreased to their minimum values.

3 Claims, 24 Drawing Figures

FIG. 3

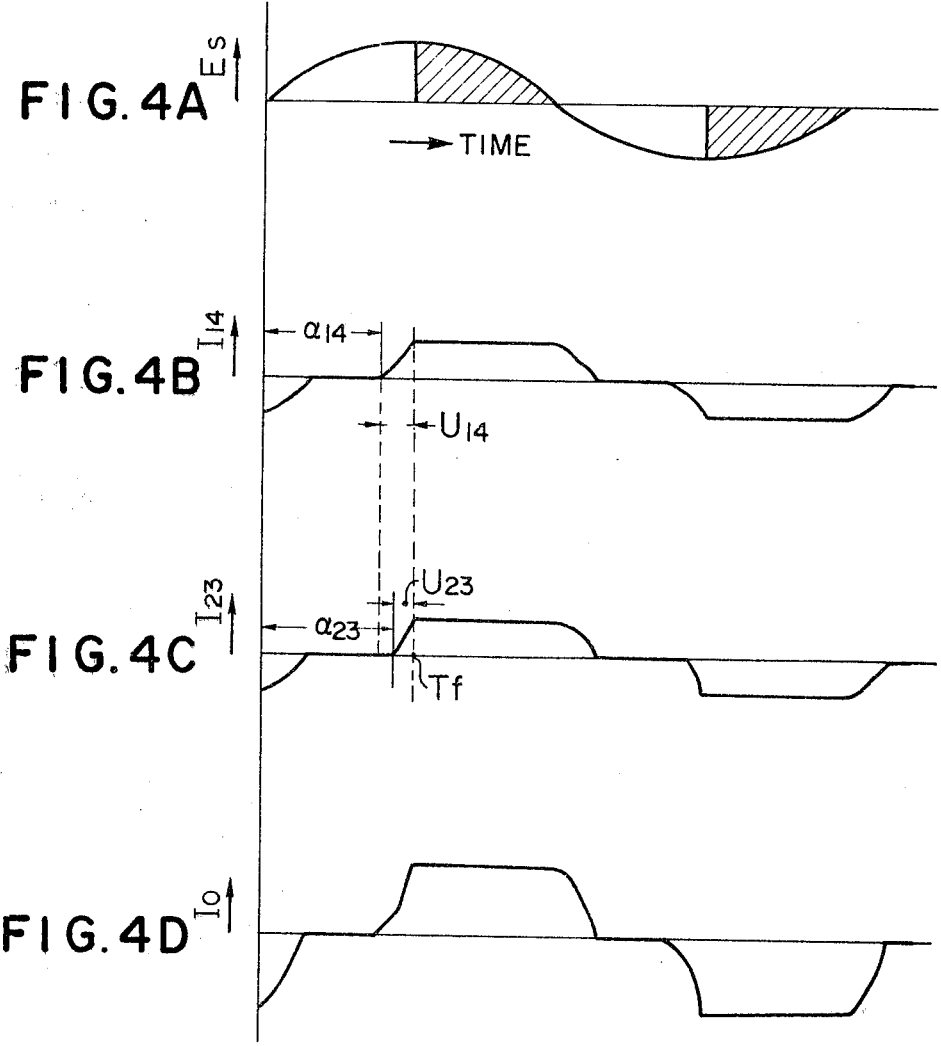

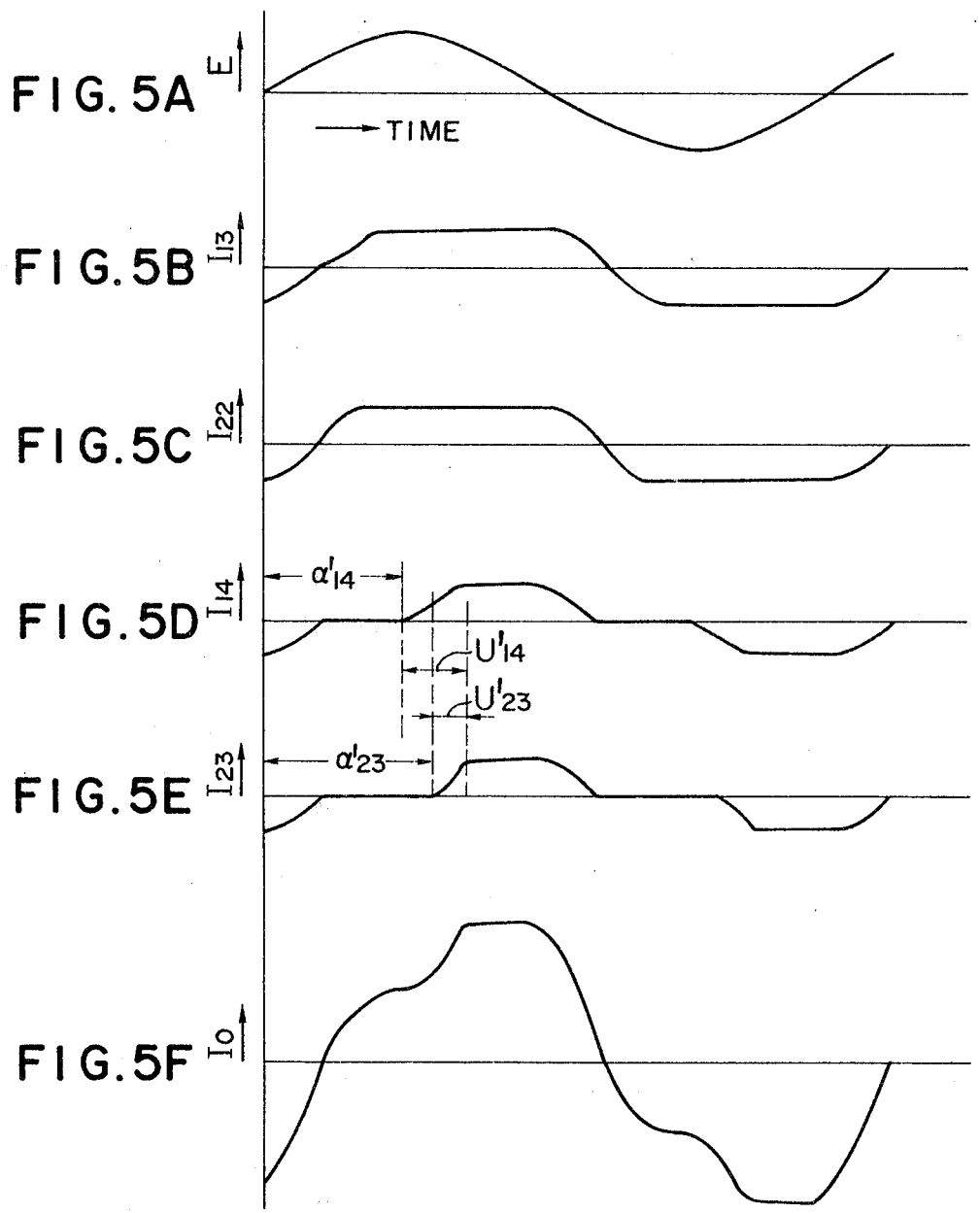

MODE I
Ea  α:90°
Io

MODE I
Ea  α:0°
Io

MODE II
Ea  α:90°
Io

MODE II
Ea  α:0°
Io

MODE III
Ea  α:90°
Io

MODE III
Ea  α:0°
Io

MODE IV
Ea  α:90°
Io

MODE IV
Ea  α:0°
Io

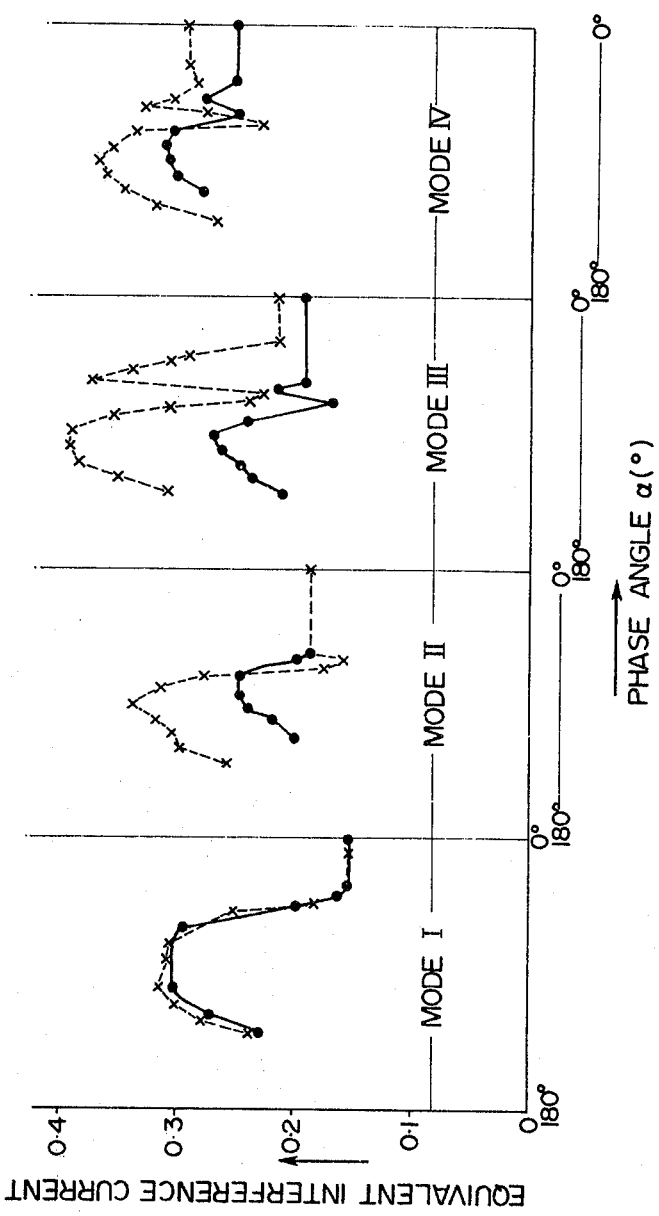

FIG. 9

ELECTRIC POWER CONVERTER APPARATUS FOR AN A.C. ELECTRIC ROLLING STOCK

This invention relates to an improvement in an electric power converter apparatus for an electric rolling stock.

In an a.c. electric rolling stock, a rectifier system converts a.c. power received from an aerial conductor into d.c. power to drive a d.c. electric motor. The starting and speed control for the d.c. motor is effected by controlling the d.c. output voltage from the rectifier system.

The rectifier system comprises bridge rectifier circuits each including two or more thyristors whose phase control angles are controlled to regulate the d.c. output voltage. Since a smoothing reactor having a large inductance value is connected on the output side of the bridge rectifier circuits, an a.c. current having a waveform more similar to a square wave than to a sine wave will flow through the bridge rectifier circuits on the output side when the thyristors are phase controlled. This results in a large amount of harmonics contained in the power source current. Harmonic currents flowing through the aerial conductor may cause inductive interference to communication and signal lines.

In order to reduce such harmonic currents, a system is well known in which the secondary winding of a transformer is divided into a plurality of sections, each section being connected to a bridge rectifier circuit, and all d.c. output terminals of the bridge rectifier circuits are connected in series. Such systems are disclosed in U.S. Pat. No. 4,030,018 issued to Tsuboi on June 14, 1977 and in U.S. Pat. No. 3,419,786 issued to M. D. Brane on Dec. 31, 1968.

The bridge rectifier circuits to be connected to the secondary windings of a transformer may be of the phase-controlled type in which the d.c. output voltage is continuously variable, or otherwise of the non-phase-controlled type in which the d.c. output voltage is constant. A phase-controlled bridge rectifier circuit may comprise four thyristors, or two pairs of thyristors and diodes, to form a bridge. The d.c. output voltage from the bridge rectifier circuit is varied by controlling phase control angles of the thyristors. For example, the rectifier circuit disclosed in U.S. Pat. No. 4,030,018 comprises a pair of thyristors and a pair of diodes and is called a complex bridge rectifier circuit.

A non-phase-controlled bridge rectifier circuit may comprise four bridged diodes as described in U.S. Pat. No. 3,419,786 in which a switch connected to the bridge rectifier circuit on its output side operates to control the d.c. output voltage to turn it on and off. When the switch is closed, the bridge rectifier circuit provides a maximum d.c. output voltage. The switch may be replaced by a complex bridge rectifier circuit as described in the above described U.S. Pat. No. 4,030,018. In this case, thyristors serve as both switches and diodes with their phase control angles maintained substantially at zero.

In order to further reduce harmonic currents, it is known to allow thyristors of each bridge rectifier to have different phase control angles or commutation overlapping angles from each other, as discribed in Japanese Patent Application Kokai (Laid-Open) No. 94529/76 laid open on Aug. 19, 1976 corresponding to U.S. Pat. No. 4,122,515.

When a single transformer is used, harmonic current can be reduced by the arrangement described above. However, if the bridge rectifier circuits connected to the secondary windings of a plurality of transformers are phase controlled simultaneously in a rolling stock provided with a plurality of transformers, all currents flowing through the primary windings of the transformers have substantially the same phase and waveform. These currents overlap the a.c. supply current and harmonic currents contained in the a.c. source current increase in proportion to the number of transformers used.

These disadvantages can be eliminated by shifting the primary winding current phases of the transformers from each other. In the system described in Japanese Patent Publication No. 35944/76 published on Oct. 5, 1976, each secondary winding of a plurality of transformers is divided into sections in such a manner that each of the transformers has at least one section of winding, which sections of winding provide different voltages so as to shift primary currents of the transformers from each other. In such a system, however, each transformer has a different number of turns of secondary winding and thus it is not possible to use a plurality of transformers having the same specifications, for example, with respect to their core structure, winding structure, and dimensions.

It is an object of the invention to provide a power converter apparatus for an a.c. electric rolling stock, which comprises a plurality of transformers of the same specification and produces less harmonic currents.

It is another object of the invention to provide a power converter apparatus for an a.c. electric rolling stock, which is easy to manufacture and produces less harmonic currents.

According to the present invention there is provided a power converter apparatus comprising a plurality of transformers including a primary winding and a plurality of secondary windings generating the same output voltages but having different internal reactances, and bridge rectifier circuits connected to the secondary windings of each transformer, said bridge rectifier circuits associated with each transformer including one phase-controlled bridge rectifier, wherein the winding connected to each phase-controlled bridge rectifier circuit has a different internal reactance from each other.

According to the present invention there is also provided a power converter apparatus comprising a plurality of transformers including a primary winding and a plurality of secondary windings generating the same output voltages but having different internal reactances, and phase-controlled bridge rectifier circuits connected to the secondary windings of the transformers, wherein the phase-controlled bridge rectifier circuits are constructed to be simultaneously controlled.

The foregoing objects and other objects as well as the characteristic features of the invention will become more apparent by the following description when taken in conjunction with the accompanying drawings:

FIG. 3 shows waveforms of output voltages from the bridge rectifier circuits used in the embodiment of FIG. 1;

FIGS. 4A to 4D show waveforms of voltages and currents illustrating operation in Mode I of the embodiment of FIG. 1;

FIGS. 5A to 5F show waveforms of voltages and currents illustrating operation in Mode II of the embodiment of FIG. 1;

FIG. 7 shows oscillograms obtained from an actual observation of harmonic currents in the embodiment of FIG. 1;

FIG. 9 shows waveforms of output voltages from the bridge rectifier circuits used in the embodiment of FIG. 8.

Figure 1:
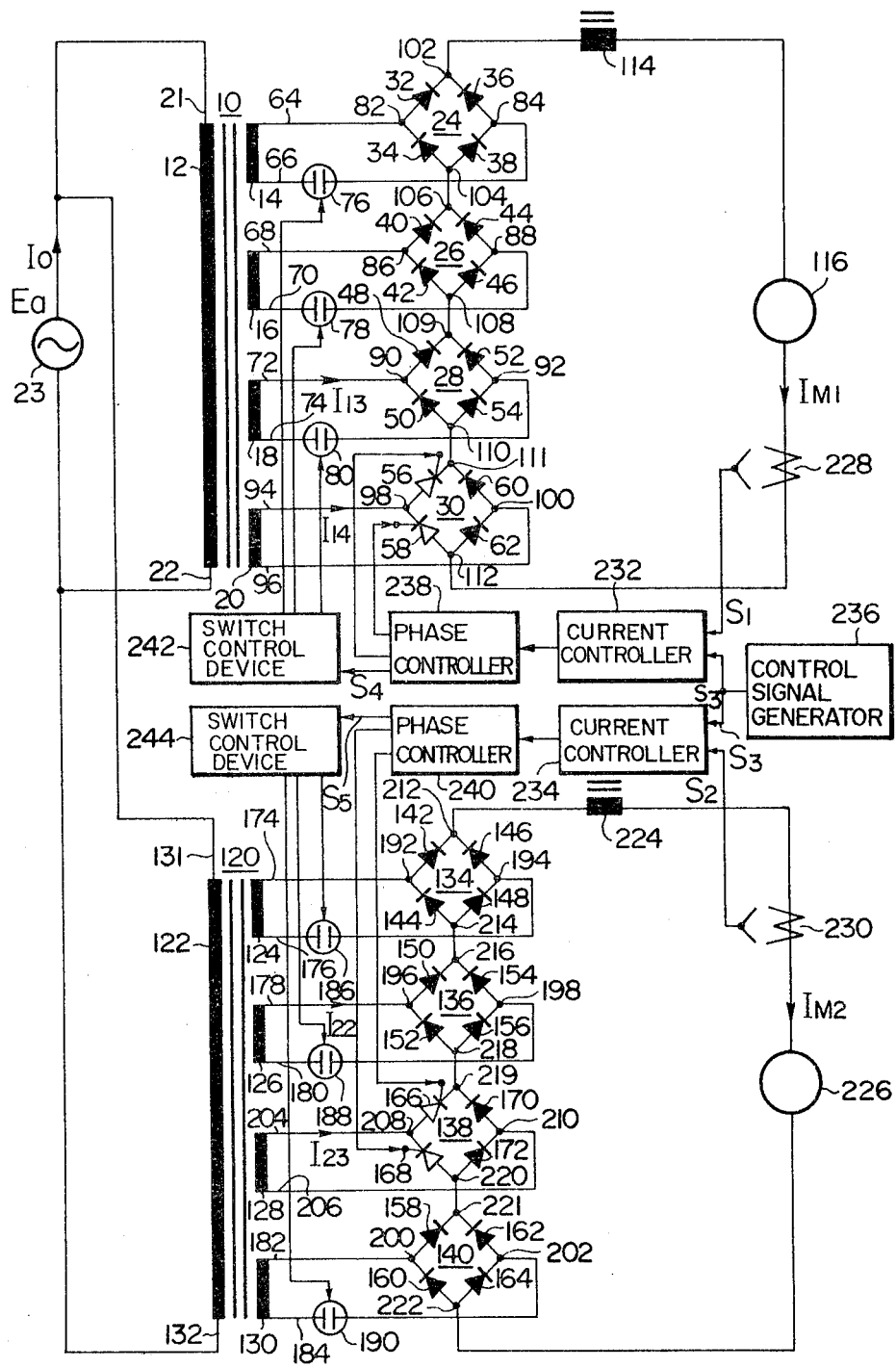
FIG. 1 shows an electric circuit diagram of one embodiment of the present invention.

FIG. 1 shows an electric circuit diagram illustrating one embodiment of the present invention. A first transformer 10 comprises a primary winding 12 and four secondary windings 14, 16, 18 and 20. The primary winding has input terminals 21 and 22 connected to a single-phase a.c. power source 23, and the secondary windings 14, 16, 18 and 20 are connected to bridge rectifier circuits 24, 26, 28 and 30, respectively. The bridge rectifier circuits 24, 26 and 28 include four diodes each, i.e. diodes 32, 34, 36 and 38, diodes 40, 42, 44 and 46, and diodes 48, 50, 52 and 54, respectively, and each bridge rectifier circuit forms a diode bridge rectifier circuit of the non-phase-control type. The bridge rectifier circuit 30 includes thyristors 56 and 58 and diodes 60 and 62 and forms a complex bridge rectifier circuit of the phase control type.

Output terminals 64 and 66 of the secondary winding 14 are connected through a switch 76 to a.c. terminals 82 and 84 of the diode bridge rectifier circuit 24. Similarly, output terminals 68 and 70 of the secondary winding 16 are connected through a switch 78 to a.c. terminals of the diode bridge rectifier circuit 26, and output terminals 72 and 74 of the secondary winding 18 are connected through a switch 80 to a.c. terminals 90 and 92 of the diode bridge rectifier circuit 28. Output terminals 94 and 96 of the secondary winding 20 are connected to a.c. terminals 98 and 100 of the complex bridge rectifier circuit 30. D.c. terminals 102, 104, 106, 108, 109, 110, 111 and 112 of the bridge rectifier circuits 24, 26, 28 and 30 are connected in series. A smoothing reactor 114 and a d.c. motor 116 for driving an electric rolling stock are connected between the d.c. terminals 102 and 112.

A second transformer 120 comprises a primary winding 122 and four secondary windings 124, 126, 128 and 130. The primary winding 122 has input terminals 131 and 132 connected together with the primary winding 12 of the first transformer to the single-phase a.c. power source 23, and the secondary windings 124, 126, 128 and 130 are connected to bridge rectifier circuits 134, 136, 138 and 140, respectively. The bridge rectifier circuits 134, 136 and 140 include four diodes, i.e. diodes 142, 144, 146 and 148, diodes 150, 152, 154 and 156, and diodes 158, 160, 162 and 164, respectively, and each bridge rectifier circuit forms a diode bridge rectifier circuit of the non-phase-control type.

The bridge rectifier circuit 138 includes thyristors 166 and 168 and diodes 170 and 172 and forms a complex bridge rectifier circuit of the phase control type.

Output terminals 174 and 176 of the secondary winding 124 are connected through a switch 186 to a.c. terminals 192 and 194 of the bridge rectifier circuit 134. Similarly, output terminals 178 and 180 of the secondary winding 126 are connected through a switch 188 to a.c. terminals 196 and 198 of the bridge rectifier circuit 136, and output terminals 182 and 184 of the secondary winding 130 are connected through a switch 190 to a.c. terminals 200 and 202 of the bridge rectifier circuit 140. Output terminals 204 and 206 of the secondary winding 128 are connected to a.c. terminals 208 and 210 of the complex bridge rectifier circuit 138. D.c. terminals 212, 214, 216, 218, 219, 220, 221 and 222 of the bridge rectifier circuits 134, 136, 138 and 140 are connected in series. A smoothing reactor 224 and a d.c. motor 226 for driving an electric rolling stock are connected between the d.c. terminals 212 and 222.

Current detectors 228 and 230 detect currents $I_{M1}$ and $I_{M2}$ flowing through the d.c. motors 116 and 226, respectively, and supply detected outputs $S_1$ and $S_2$ to current controllers 232 and 234, respectively. The current controllers 232 and 234 compare the detected outputs $S_1$ and $S_2$, respectively, with a control signal $S_3$ supplied by a control signal generator 236 so as to control phase controllers 238 and 240, respectively. Thus, the thyristors 56, 58, 166 and 168 undergo phase control in such a manner that both currents $I_{M1}$ and $I_{M2}$ flowing through the d.c. motors 116 and 226 become equal to the control signal $S_3$.

When phase control angles of the thyristors 56, 58, 166 and 168 become minimum (the complex bridge rectifier circuits 30 and 138 produce maximum d.c. voltage outputs), the phase controllers 238 and 240 supply switch commands $S_4$ and $S_5$ to switch control devices 242 and 244, respectively, and simultaneously increase the phase control angles of the thyristors 56, 58, 166 and 168 to maximum phase. In response to each switch command $S_4$ and $S_5$, the switch control devices 242 and 244 close the switches 80, 78 and 76 in this sequence and the switches 188, 186 and 190 in this sequence, respectively.

Figure 2:
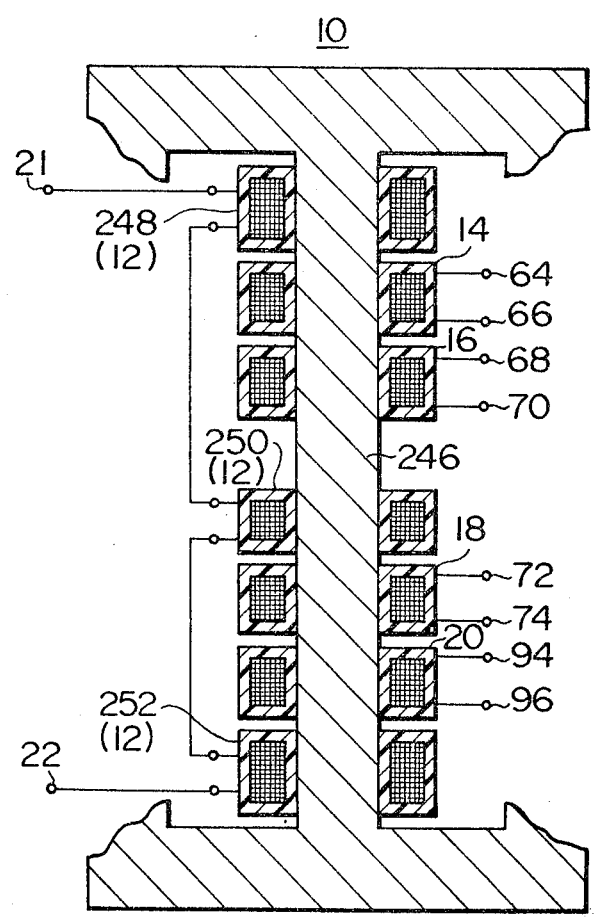
FIG. 2 shows a cross-sectional view illustrating part of the winding structure of a transformer which may be used as the first and second transformers in the embodiment of FIG. 1.
Figure 6A:
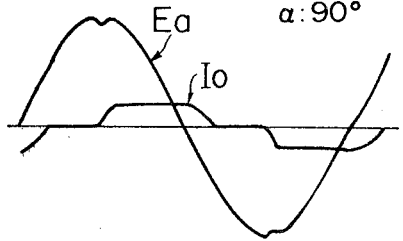
FIGS. 6A to 6H show waveforms of voltages and currents in each Mode of operation of the embodiment of FIG. 1.
Figure 6E:
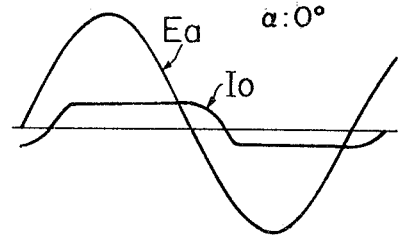
Figure 6B:
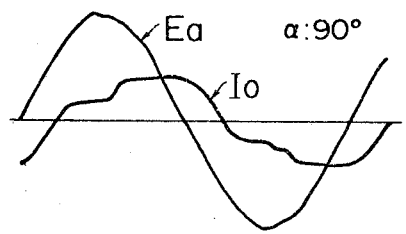
Figure 6F:
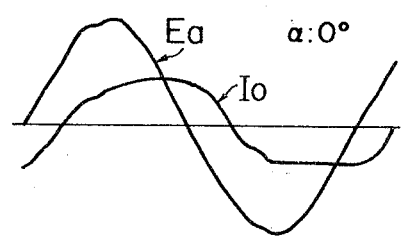
Figure 6C:
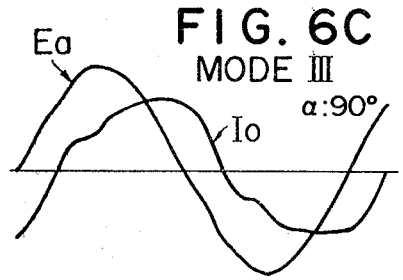
Figure 6G:
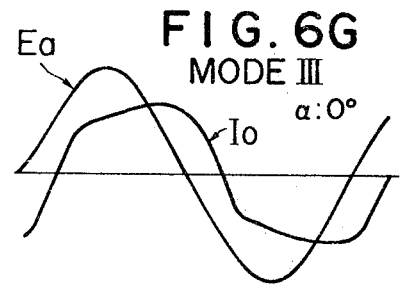
Figure 6D:
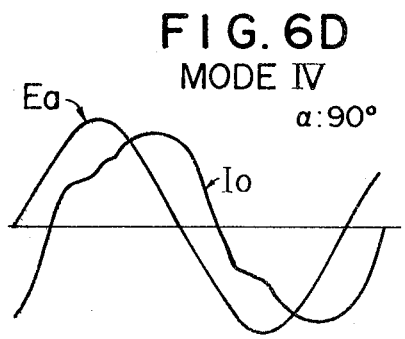
Figure 6H:
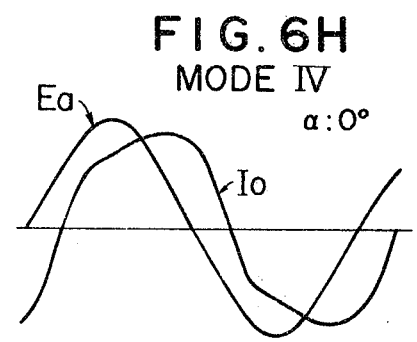

As shown in FIG. 2, the first transformer 10 comprises a magnetic core 246, a primary winding 12 including three winding sections 248, 250 and 252 disposed asymmetrically on the magnetic core 246, and a plurality of secondary windings 14, 16, 18 and 20. The secondary windings 14 and 16 are disposed between the winding sections 248 and 250, and the secondary windings 18 and 20 are disposed between the winding sections 250 and 252. Since the secondary windings 14, 16, 18 and 20 are disposed in different locations as described above, the leakage reactance of each secondary winding, viewed from the primary side, is different from each other. As a result, internal reactance values of the secondary windings 14, 16, 18 and 20, viewed from the primary side, are different as shown below.

Secondary winding 14—2.43 ohms
Secondary winding 16—2.23 ohms
Secondary winding 18—2.46 ohms
Secondary winding 20—2.68 ohms The second transformer 120 has the same iron core structure, winding structure, and dimensions as the first transformer 10. As shown in FIG. 1, the complex bridge rectifier circuit 30 of the phase control type is connected to the secondary winding 20 of the first transformer 10 while the complex bridge rectifier circuit 138 of the phase control type is connected to the secondary winding 128 of the second transformer 120, the secondary winding 128 being not corresponding in location with the secondary winding 20. That is, the complex bridge rectifier circuits 30 and 138 are connected, respectively, to the secondary windings 20 and 128 which have different internal reactances.

When the d.c. motors 116 and 226 stop in FIG. 1, detected outputs $S_1$ and $S_2$ from the current detectors 228 and 230 are both zero. When the control signal $S_3$ is generated by the control signal generator 236, the current controllers 232 and 234 control the phase controllers 238 and 240 in accordance with the control signal $S_3$. First, the phase controllers 238 and 240 fires thyristors 56, 58, 166 and 168 at the maximum phase control angle $\alpha$. The thyristors 56 and 166 are turned on during positive half cycles and the thyristors 30 and 168 are turned on during negative half cycles, so that currents represented by the hatched portions of the waveforms in Mode I in FIG. 3 flow between the d.c. terminals 111 and 112 and between the d.c. terminals 219 and 220, respectively. Since the switches 76, 78, 80, 186, 188 and 190 are opened, the d.c. terminals of the bridge rectifier circuits 24, 26, 28, 134, 136 and 140 are at zero volt as shown in Mode I in FIG. 3. Thus, the output from the complex bridge rectifier circuit 30 is supplied to the d.c. motor 116 through the bridge rectifier circuits 28, 26 and 24, and the output from the complex bridge rectifier circuit 138 is supplied to the d.c. motor 226 through the bridge rectifier circuits 136, 134 and 140.

When currents $I_{M1}$ and $I_{M2}$ flow through the d.c. motors 116 and 226, detected outputs $S_1$ and $S_2$ from the current detectors 228 and 230 increase. After the d.c. motors 116 and 226 are started, the current controllers 232 and 234 control phase controllers 238 and 240 in accordance with the difference $(S_3-S_1)$ between control signal $S_3$ and detected output $S_1$ and the difference $(S_3-S_2)$ between control signal $S_3$ and detected output $S_2$, respectively. Thus, phase control angle $\alpha$ of the thyristors 56, 58, 166 and 168 is automatically controlled in a manner that motor currents $I_{M1}$ and $I_{M2}$ become equal to the control signal $S_3$. As the d.c. motors 116 and 226 rotate at increasing speeds, the control angle $\alpha$ decreases gradually as indicated by the arrow in FIG. 3, Mode 1. The d.c. output voltages from the complex bridge rectifier circuits 30 and 138 increase and the numbers of revolutions of the d.c. motors 116 and 226 also increase. For simplification, it is herein assumed that the d.c. motors 116 and 226 have the same load characteristic and are controlled to receive the same voltage and current.

Figure 3:
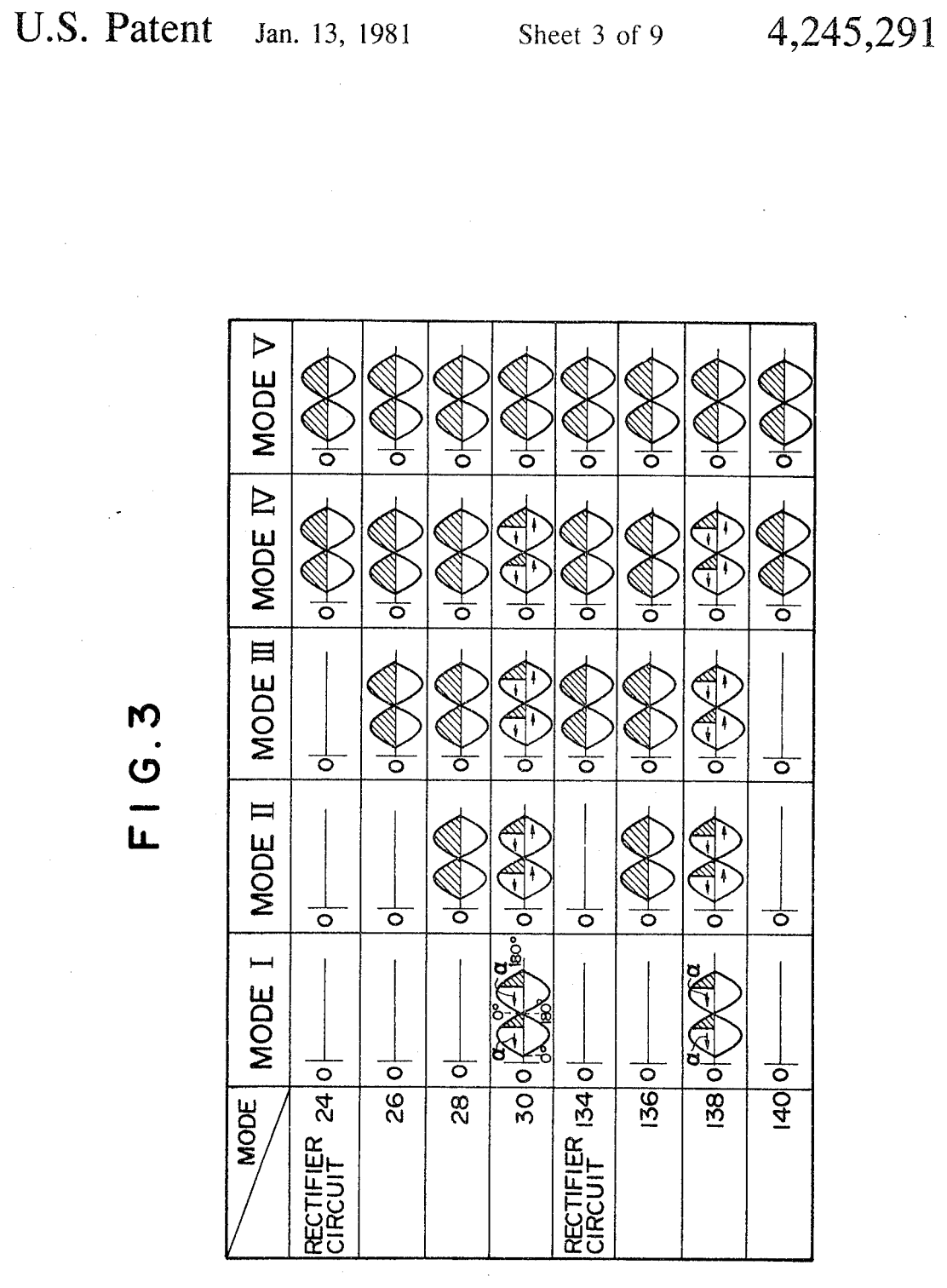

In mode 1 in FIG. 3, an a.c. voltage Es as shown in FIG. 4A is generated in the secondary windings of each transformer. Assuming that $\alpha_{14}$ and $\alpha_{23}$ are phase angles of complex bridge rectifier circuits 30 and 138 of the phase control type, respectively, currents $I_{14}$ and $I_{23}$ as shown in FIGS. 4A and 4B flow through the first transformer 10 and the second transformer 120, respectively. As described previously, the internal reactance of the secondary winding 20 of the first transformer is greater than that of the secondary winding 130 of the second transformer and therefore the commutation overlapping angle $U_{14}$ of the thyristors 56 and 58 is greater than the commutation overlapping angle $U_{23}$ of the thyristors 166 and 168.

In order to supply the same voltage and current to the d.c. motors 116 and 226, both complex bridge rectifier circuits 30 and 138 must provide the same output voltage. The current controllers 232 and 234 compare the control signal $S_3$ with detected outputs $S_1$ and $S_2$, respectively, to control the phase controllers 238 and 240, respectively. Consequently, the control angle $\alpha_{14}$ of the thyristors 56 and 58 becomes smaller than the control angle $\alpha_{23}$ of the thyristors 166 and 168 as shown in FIGS. 4B and 4C, and commutation turn-off points $T_f$ for the complex bridge rectifier circuits 30 and 138 coincide with each other. Since it is considered in effect that the complex bridge rectifier circuits 30 and 138 provide output voltage after the commutation turn-off point $T_f$, the output voltages from the complex bridge rectifier circuits 30 and 138 coincide with each other as indicated by the hatched portions in FIG. 4A. Therefore, coincident waveforms of output voltage are illustrated for the complex bridge rectifier circuits 30 and 138 in FIG. 3, mode I.

Current $I_O$ flowing through the single-phase a.c. source 23 has a waveform which is approximately the same as the waveform of the sum of the currents $I_{14}$ and $I_{23}$, as shown in FIG. 4D. Since the currents $I_{14}$ and $I_{23}$ are different in phase from each other as shown in FIGS. 4B and 4C, the proportions of harmonic currents contained in the power source current are reduced. Reduction of harmonic currents by phase shifting is described in detail in U.S. Pat. No. 4,122,515.

When control angle $\alpha$ of the thyristors 56, 58, 166 and 168 reaches the minimum phase, the complex bridge rectifier circuits 30 and 138 provide maximum d.c. output voltages. At this time, the phase controllers 238 and 240 generate switch commands $S_4$ and $S_5$ and simultaneously return the control angle $\alpha$ of the thyristors 56, 58, 166 and 168 to the maximum phase. In response to the switch commands $S_4$ and $S_5$, the switch control devices 242 and 244 close the switches 80 and 188. Then the bridge rectifier circuits 28 and 136 provide maximum d.c. voltage outputs while the complex bridge rectifier circuits 30 and 138 provide zero d.c. voltage outputs.

The control angle $\alpha$ of the thyristors 56 and 58 is then decreased gradually as shown in FIG. 3, mode II, and the d.c. output voltages from the complex bridge rectifier circuits 30 and 138 increase in the same manner as in Mode I. The sum of output voltages from the bridge rectifier circuits 28 and 30 appears between the d.c. output terminals 102 and 112, and the sum of output voltages from the bridge rectifier circuits 136 and 138 appears between the d.c. output terminals 212 and 222. These voltages are supplied to the d.c. motors 116 and 226 through the bridge rectifier circuits 26 and 24 and through the bridge rectifier circuits 134 and 140, respectively. In this case, the current controllers 232 and 234 also control the phase controllers 238 and 240 so that the d.c. motors 116 and 226 can be supplied with the same voltage and current. In Mode II, the bridge rectifier circuits 28 and 136 produce d.c. outputs during a whole period as shown in FIG. 3. Consequently, currents $I_{13}$ and $I_{22}$ as shown in FIGS. 5B and 5C flow through the secondary windings 18 and 126 of the second transformer. The secondary windings 18 and 126 connected respectively to bridge rectifier circuits 28 and 136 have different internal reactances, i.e. 2.46 ohms and 2.23 ohms, respectively. Therefore, the current $I_{13}$ flowing through the secondary winding 18 having a relatively large internal reactance is delayed in phase than the current $I_{22}$ flowing through the secondary winding 126 having a relatively small internal reactance.

When the thyristors 56, 58, 166 and 168 are fired at control angle α, currents $I_{14}$ and $I_{23}$ as shown in FIGS. 5D and 5E flow through the secondary windings 20 and 128 of the transformer, respectively. The commutation overlapping angle $U_{14}'$ is determined by the resultant internal reactance (5.04 ohms) of the secondary windings 18 and 20 of the first transformer while the commutation overlapping angle $U_{23}'$ is determined by the resultant internal reactance (4.69 ohms) of the secondary windings 126 and 128 of the second transformer. Therefore, the difference in phase between both currents is greater than that shown in Mode I in FIG. 4.

The current $I_O$ flowing through the a.c. power source 23 is the sum of the currents $I_{13}$, $I_{22}$, $I_{14}$ and $I_{23}$ and has a waveform as shown in FIG. 5F. These currents are different in phase from each other, and the proportions of harmonic currents contained in the power source current are reduced in the same manner as in Mode I.

When the switches 78 and 76 are turned on so as to control the thyristors 56, 58, 166 and 168 in a manner described above, output voltages from the bridge rectifier circuits 24, 26, 28, 30, 134, 136, 138 and 140 are varied as shown in Modes III to IV in FIG. 3. Currents flowing through the secondary windings 14, 16, 18 and 20 of the first transformer 10 and through the secondary windings 124, 126, 128 and 130 of the second transformer 120 are different in phase from each other, and the proportions of harmonic currents contained in the power source current are maintained small.

FIGS. 6A to 6H show oscillograms illustrating waveforms of the power source voltage Ea and power source current $I_O$ obtained from an actual arrangement according to the above-described embodiment. FIGS. 6A to 6D indicate waveforms obtained when the control angle α of the thyristors 56, 58, 166 and 168 is 90° in Modes I to IV in FIG. 3, and FIGS. 6E to 6H indicate waveforms obtained when the control angle α of these thyristors is 0°. It should be apparent from these oscillograms that the waveforms of the power source current $I_O$ are relatively smooth and close to the sine wave in Modes II to V in which a relatively large phase deviation is involved, although the waveforms are not satisfactorily improved in Mode I in which a relatively small phase deviation is involved.

FIG. 7 shows harmonic currents contained in the power source current, and in particular, equivalent interference current $J_p$, measured in an arrangement according to the above-described embodiment, where the rated current of each d.c. motor is 10 A, the rated primary current of each transformer is 20 A, and the rated voltage and current of the single-phase a.c. power source 23 are 200 V and 40 A, respectively. The solid lines indicate values derived from the arrangement embodying the present invention, and the dotted lines indicate values measured without a phase difference between the secondary windings of each transformer.

As described in detail in U.S. Pat. No. 4,122,515, the equivalent interference current $J_p$ is given by $$J_p = \sqrt{\sum_n (S_n \cdot I_n)^2}$$

where $I_n$ is the effective value of the n-th harmonic current contained in the power source current and $S_n$ is the weight which indicates the degree of inductive interference to be caused by the harmonic current.

In Mode I in FIG. 7, harmonics are not effectively reduced. This may be due to the fact that the small difference in reactance between the secondary windings 20 and 130 causes an insufficient phase difference.

Figure 8:
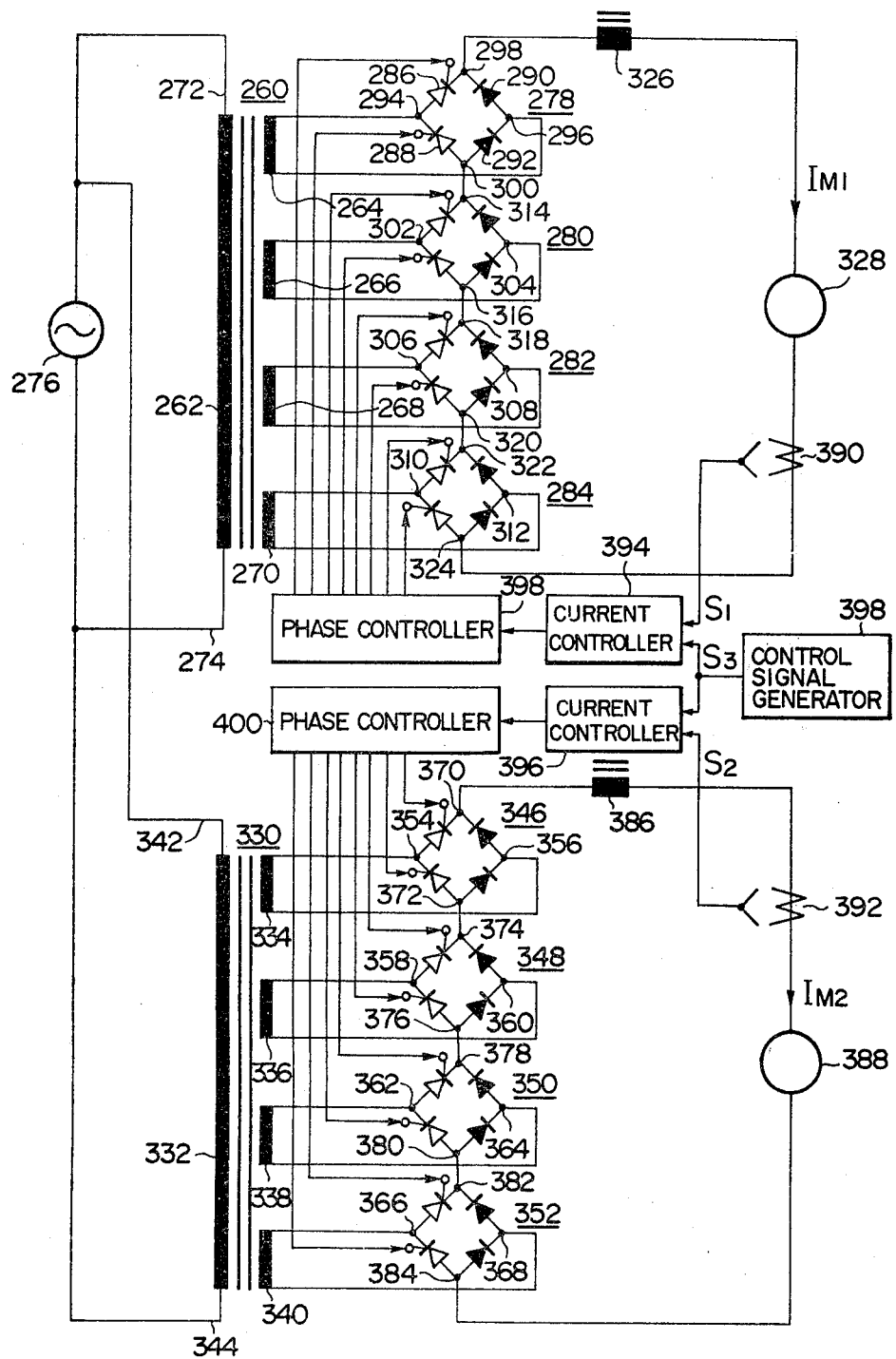
FIG. 8 shows an electric circuit diagram of another embodiment of the present invention.

FIG. 8 shows an electric circuit diagram illustrating another embodiment of the present invention. In the embodiment shown in FIG. 1, complex bridge rectifier circuits 30 and 138 of the phase-controlled are connected, respectively, to one secondary winding of a transformer and one secondary winding of another transformer, and these complex rectifier circuits 30 and 138 are repeatedly controlled in Modes I to V. This requires switch control devices which operate to permit bridge rectifier circuits of the non-phase-control type to provide maximum outputs when the control angle of the thyristors in the complex bridge rectifier circuits 30 and 138 of the phase control type reaches the maximum phase. In the embodiment shown in FIG. 8, however, a bridge rectifier circuit of the phase control type is connected to every secondary winding of each transformer, and these bridge rectifier circuits of the phase control type are controlled in sequence. Therefore, any switch control devices or switches are not used. The bridge rectifier circuits of the phase control type, which are to be controlled simultaneously, are connected to secondary windings having different internal reactances.

In FIG. 8, a first transformer 260 comprises a primary winding 262 and four secondary windings 264, 266, 268 and 270. The primary winding 262 has input terminals 272 and 274 connected to a single-phase a.c. power source 276, and the secondary windings 264, 266, 268 and 270 are connected, respectively, to complex rectifier circuits 278, 280, 282 and 284 of the phase control type. The complex bridge rectifier circuit 278 comprises a pair of thyristors 286 and 288 and a pair of diodes 290 and 292, and also has a.c. terminals 294 and 296 and d.c. terminals 298 and 300.

The other complex bridge rectifier circuits 280, 282 and 284 have the same configuration as the complex bridge rectifier circuit 278, and include a.c. terminals 302 and 304, 306 and 308, and 310 and 312, respectively, and also d.c. terminals 314 and 316, 318 and 320, and 322 and 324, respectively. These d.c. terminals 298, 300, 314, 316, 318, 320, 322 and 324 are connected in series. A smoothing reactor 326 and a d.c. motor 328 for driving an electric rolling stock are connected between the d.c. terminals 298 and 324.

A second transformer 330 comprises a primary winding 332 and four secondary windings 334, 336, 338 and 340. The primary winding 332 has input terminals 342 and 344 connected to a single-phase a.c. power source 276. The secondary windings 334, 336, 338 and 340 are connected, respectively, to complex bridge rectifier circuits 346, 348, 350 and 352 of the phase control type. The complex bridge rectifier circuits 346, 348, 350 and 352, which have the same configuration as the complex bridge rectifier circuits 278, 280, 282 and 284, include a.c. terminals 354 and 356, 358 and 360, 362 and 364, and 366 and 368, respectively, and also d.c. terminals 370 and 372, 374 and 376, 378 and 380, and 382 and 384, respectively. The d.c. terminals 370, 372, 374, 376, 378, 380, 382 and 384 are connected in series. A smoothing reactor 386 and a d.c. motor 388 for driving an electric rolling stock are connected between the d.c. terminals 370 and 384.

second load means connected between the d.c. output terminals of said second rectifier means, second phase control means having a plurality of output terminals connected to the gate terminals of their associated thyristors of said second phase-controlled bridge rectifier circuit, said second phase control means including means for generating a second switch command and simultaneously returning phase control angles of the thyristors of said second phase-controlled bridge rectifier circuit to maximum phases when the phase control angles of said thyristors reach minimum phases, and second switching means responsive to the second switch command for allowing one of said non-phase-controlled bridge rectifier circuits of said second rectifier means to produce its maximum d.c. output voltage.

2. A power converter apparatus for an a.c. electric rolling stock comprising a first transformer including a magnetic core, a primary winding and a plurality of secondary windings, said secondary windings being disposed in different locations on said magnetic core and thereby having different reactance values, a single-phase a.c. power source connected to said primary winding of said first transformer, first rectifier means including the same number of bridge rectifier circuits as said secondary windings, said bridge rectifier circuits having a.c. terminals connected to their associated secondary windings of said first transformer and d.c. terminals connected together in series between d.c. output terminals of said first rectifier means, one of said bridge rectifier circuits being a first phase-controlled bridge rectifier circuit including at least two thyristors, and the others of said bridge rectifier circuits being non-phase-controlled bridge rectifier circuits, first load means connected between the d.c. output terminals of said first rectifier means, a first current detector for detecting current flowing through said first load means, first current control means for comparing an output from said first current detector with a control signal, first phase control means responsive to an output from said first current control means for controlling phase control angles of the thyristors of said first phase-controlled bridge rectifier circuit, said first phase control means including means for generating a first switch command and simultaneously returning phase control angles of the thyristors of said first phase-controlled bridge rectifier circuit to maximum phases when the phase control angles of said thyristors reach minimum phases, first switching means responsive to the first switch command for allowing one of said non-phase-controlled bridge rectifier circuits of said first rectifier means to produce its maximum d.c. output voltage, a second transformer including a magnetic core, a primary winding connected together with the primary winding of said first transformer to said single-phase a.c. power source, and a plurality of secondary windings, said second transformer being identical in core and winding structures and dimensions with said first transformer whereby each secondary winding of said second transformer has the same internal reactance as its corresponding secondary winding of said first transformer, second rectifier means including the same number of bridge rectifier circuits as said secondary windings, said bridge rectifier circuits having a.c. terminals connected to their associated secondary windings of second transformer and d.c. terminals connected together in series between d.c. output terminals of said second rectifier means, one of said bridge rectifier circuits being a second phase-controlled bridge rectifier circuit including at least two thyristors, and the others of said bridge rectifier circuits being non-phase-controlled bridge rectifier circuits, wherein the location of the secondary winding on its associated core connected to said second phase-controlled bridge rectifier circuit is not corresponding to the location of the secondary winding on its associated core connected to said first phase-controlled bridge rectifier circuit, second load means connected between the d.c. output terminals of said second rectifier means, a second current detector for detecting current flowing through said second load means, second current control means for comparing an output from said second current detector with a control signal, second phase control means responsive to an output from said second current control means for controlling phase control angles of the thyristors of said second phase-controlled bridge rectifier circuit, said second phase control means including means for generating a second switch command and simultaneously returning phase control angles of the thyristors of said second phase-controlled bridge rectifier circuit to maximum phases when the phase control angles of said thyristors reach minimum phases, and second switching means responsive to the second switch command for allowing one of said non-phase-controlled bridge rectifier circuits of said second rectifier means to produce its maximum d.c. output voltage.

3. A power converter apparatus for an a.c. electric rolling stock comprising a first transformer including a primary winding and a plurality of secondary windings having different internal reactance values, a single-phase a.c. power source connected to said primary winding of said first transformer, first rectifier means including the same number of bridge rectifier circuits as said secondary windings, said bridge rectifier circuits having a.c. terminals connected to their associated secondary windings of said first transformer and d.c. terminals connected together in series between d.c. output terminals of said first rectifier means, each bridge rectifier circuit being a first phase-controlled bridge rectifier circuit including at least two thyristors, first load means connected between the d.c. output terminals of said first rectifier means, first phase control means having a plurality of output terminals connected to the gate terminals of their associated thyristors of said first phase-controlled bridge rectifier circuits, a second transformer including a primary winding connected together with the primary winding of said first transformer to said single-phase a.c. power source, and the same number of secondary Current detectors 390 and 392 detect currents $I_{M1}$ and $I_{M2}$ flowing through the d.c. motors 328 and 388, respectively, and supply detected outputs $S_1$ and $S_2$ to current controllers 394 and 396, respectively. The current controllers 394 and 396 compare the detected outputs $S_1$ and $S_2$, respectively, with a control signal $S_3$ supplied by a control signal generator 398 so as to control phase controllers 398 and 400, respectively. Thus, the control angle α of the thyristors of each complex bridge rectifier circuit is phase controlled in such a manner that the currents $I_{M1}$ and $I_{M2}$ flowing through the d.c. motors 328 and 388 become equal to the control signal $S_3$.

The phase controllers 398 and 400 simultaneously control phases of their respective phase-controlled complex bridge rectifier circuits, one by one in sequential manner. That is, each phase controller controls the phase of the next phase-controlled complex bridge rectifier circuit when the phase control angle of the thyristors of the previous phase-controlled complex bridge rectifier circuit become minimum (i.e. the d.c. output voltage is maximum).

In the embodiment, the control sequence for both groups of complex bridge rectifier circuits are 284→280→282→278 and 350→346→352→348, respectively.

In this embodiment, the first and second transformers 260 and 330 are also similar in specifications and dimensions to the transformer illustrated in FIG. 2. Therefore, the secondary windings of each transformer have different internal reactances. The phase control sequence is so determined that each pair of bridge rectifier circuits to be simultaneously phase-controlled, such as a pair of 284 and 350, or 280 and 346, are connected to their associated secondary windings having different internal reactances.

Figure 9:
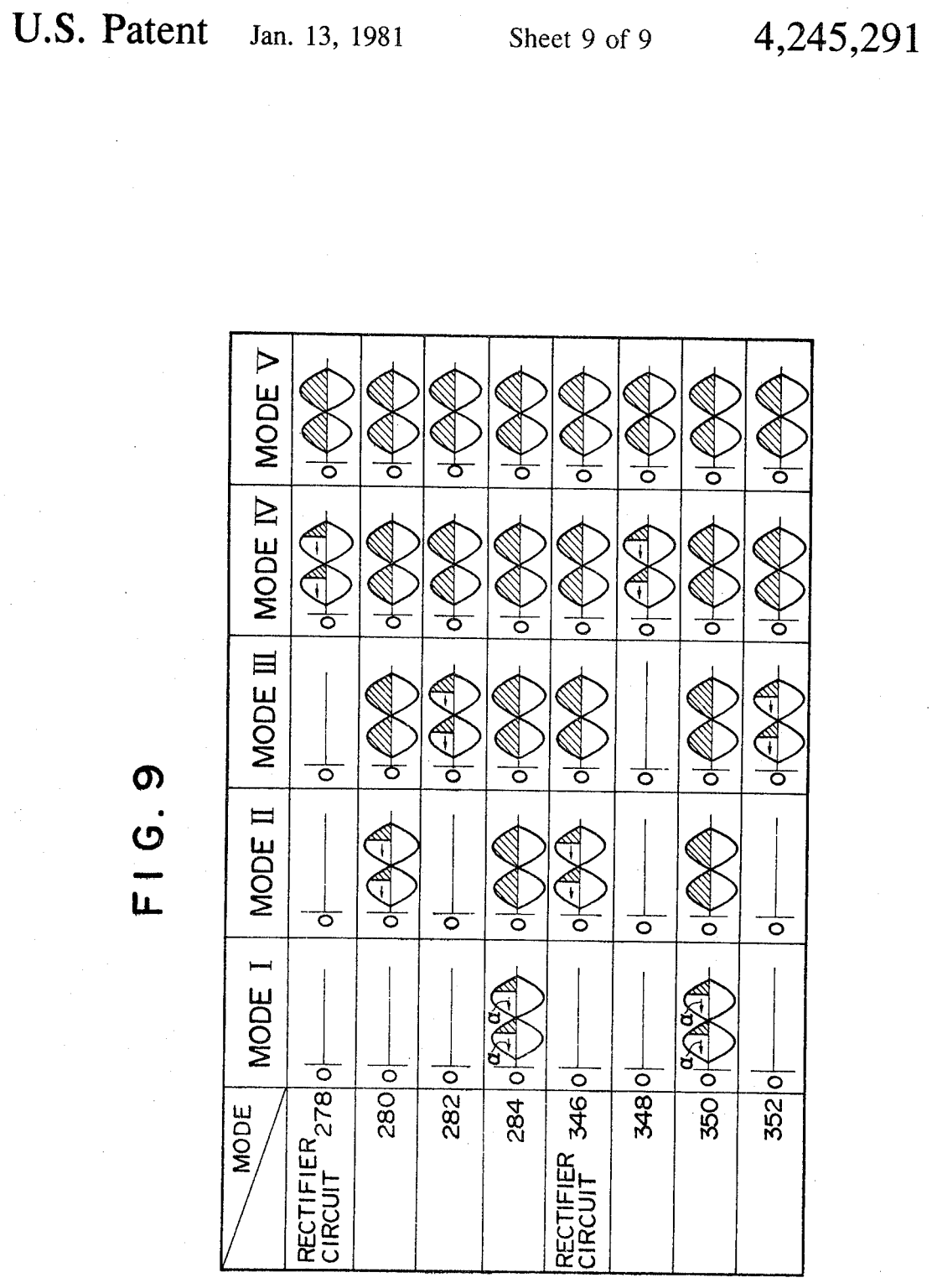

Now, the operation of the embodiment shown in FIG. 8 is described with reference to FIG. 9 showing output voltage waveforms from the phase-controlled complex bridge rectifier circuits 278, 280, 282, 284, 346, 348, 350 and 352. In Mode I in FIG. 9, the phase-control angles α of the complex bridge rectifier circuits 284 and 350 are simultaneously controlled to shift from a maximum phase toward a minimum phase. This operation is similar to that in Mode I of FIG. 3.

In Mode II, the phase control angles α of the bridge rectifier circuits 280 and 346 are simultaneously controlled to shift from a maximum phase to a minimum phase, with the phase control angles α of the bridge rectifier circuits 284 and 350 maintained at the maximum phase. In Mode III, the phase control angles α of the bridge rectifier circuits 282 and 352 are controlled to shift from a maximum phase toward a minimum phase, with the phase control angles α of the bridge rectifier circuits 280, 284, 346 and 350 maintained at the minimum phase. In Mode IV, the phase control angles α of the bridge rectifier circuits 278 and 348 are simultaneously controlled to shift from a maximum phase toward a minimum phase, with the phase control angles α of the bridge rectifier circuits 280, 282, 284, 346, 350 and 352 maintained at the minimum phase. Mode V is the state in which the phase control angles α of the bridge rectifier circuits 278 and 348 are also at the minimum phase, and in this state or Mode V all the bridge rectifier circuits 278, 280, 282, 284, 346, 348, 350 and 352 provide maximum output voltages at their outputs.

In this embodiment, each pair of bridge rectifier circuits to be simultaneously controlled, such as a pair of 284 and 350, or 280 and 346, are also connected to their associated secondary windings having different internal reactances, and accordingly the secondary currents of each transformer are different in phase from each other. Therefore, the proportions of harmonic currents contained in the power source current are reduced.

What we claim is:

1. A power converter apparatus for an a.c. electric rolling stock comprising
a first transformer including a primary winding and a plurality of secondary windings, said secondary windings having different internal reactances,
a single-phase a.c. power source connected to said primary winding of said first transformer,
first rectifier means including the same number of bridge rectifier circuits as said secondary windings, said bridge rectifier circuits having a.c. terminals connected to their associated secondary windings of said first transformer and d.c. terminals connected together in series between d.c. output terminals of said first rectifier means, one of said bridge rectifier circuits being a first phase-controlled bridge rectifier circuit including at least two thyristors, and the others of said bridge rectifier circuits being non-phase-controlled bridge rectifier circuits,
first load means connected between the d.c. output terminals of said first rectifier means,
first phase control means having a plurality of output terminals connected to the gate terminals of their associated thyristors of said first phase-controlled bridge rectifier circuit, said first phase control means including means for generating a first switch command and simultaneously returning phase control angles of the thyristors of said first phase-controlled bridge rectifier circuit to maximum phases when the phase control angles of said thyristors reach minimum phases,
first switching means responsive to the first switch command for allowing one of said non-phase-controlled bridge rectifier circuits of said first rectifier means to produce its maximum d.c. output voltage,
a second transformer including a primary winding connected together with the primary winding of said first transformer to said single-phase a.c. power source, and the same number of secondary windings as those of said first transformer, said secondary windings of said second transformer having the same internal reactances and output voltages as those of said first transformer,
second rectifier means including the same number of bridge rectifier circuits as said secondary windings of said second transformer, said bridge rectifier circuits having a.c. terminals connected to their associated secondary windings of said second transformer and d.c. terminals connected together in series between d.c. output terminals of said second rectifier means, one of said bridge rectifier circuits being a second phase-controlled bridge rectifier circuit including at least two thyristors, the secondary winding connected to said second phase-controlled bridge rectifier circuit being different in internal reactance from said secondary winding connected to said first phase-controlled bridge rectifier circuit, and the others of said bridge rectifier circuits being non-phase-controlled bridge rectifier circuits, windings as those of said first transformer, each secondary winding of said second transformer having the same internal reactance and output voltage as its corresponding winding of said first transformer, second rectifier means including the same number of bridge rectifier circuits as said secondary windings of said first transformer, said bridge rectifier circuits having a.c. terminals connected to their associated secondary windings of said second transformer and d.c. terminals connected together in series between d.c. output terminals of said second rectifier means, each bridge rectifier circuit being a second phase-controlled bridge rectifier circuit including at least two thyristors, second load means connected between the d.c. output terminals of said second rectifier means, and second phase control means having a plurality of output terminals connected to the gate terminals of their associated thyristors of said second phase-controlled bridge rectifier circuits, wherein the thyristors of a pair of phase-controlled bridge rectifier circuits each consisting of one selected from the respective first and second phase-controlled bridge rectifier circuits of said first and second rectifier means are simultaneously phase-controlled by said first and second phase control means to shift from maximum phases toward minimum phases, and when phase control angles of the thyristors of said pair of first and second phase-controlled bridge rectifier circuits reach minimum phases, the thyristors of another pair of first and second phase-controlled bridge rectifier circuits are simultaneously controlled in the same manner, and wherein each pair of first and second phase-controlled bridge rectifier circuits to be simultaneously controlled are selected from the two transformers to be those connected to windings having different internal reactances in their associated transformers.

* * * * *